Feb. 6, 1968   H. G. JOHNSON   3,367,359
BALL VALVE ASSEMBLY WITH CORROSION RESISTANT LINING
Filed Jan. 5, 1966   3 Sheets-Sheet 1
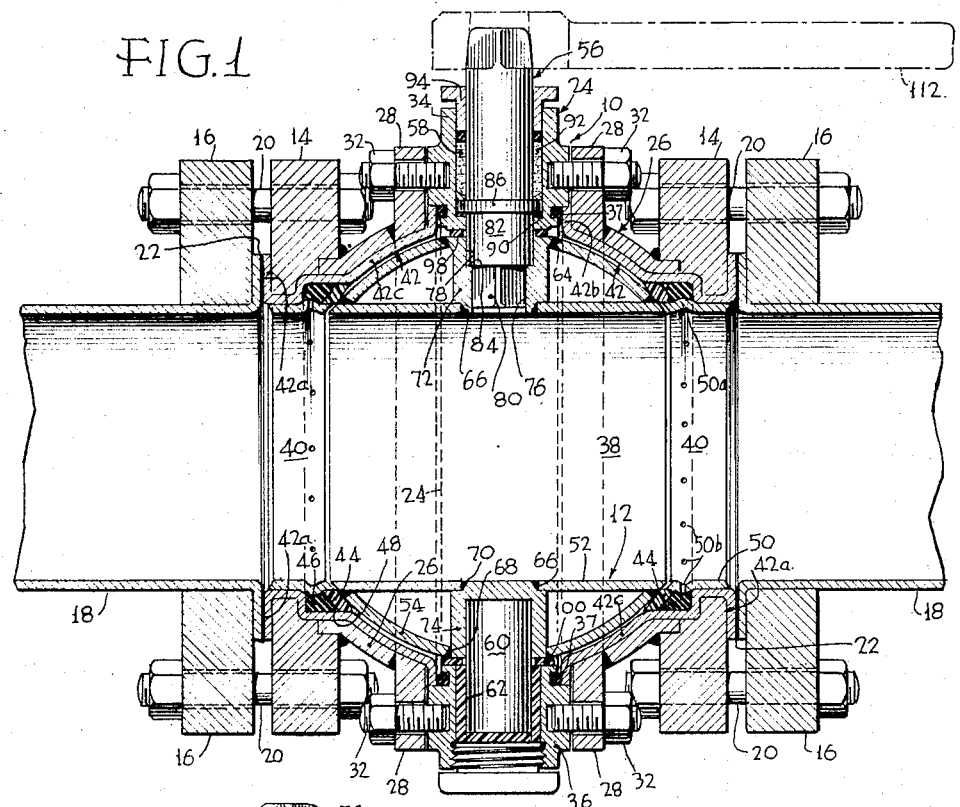
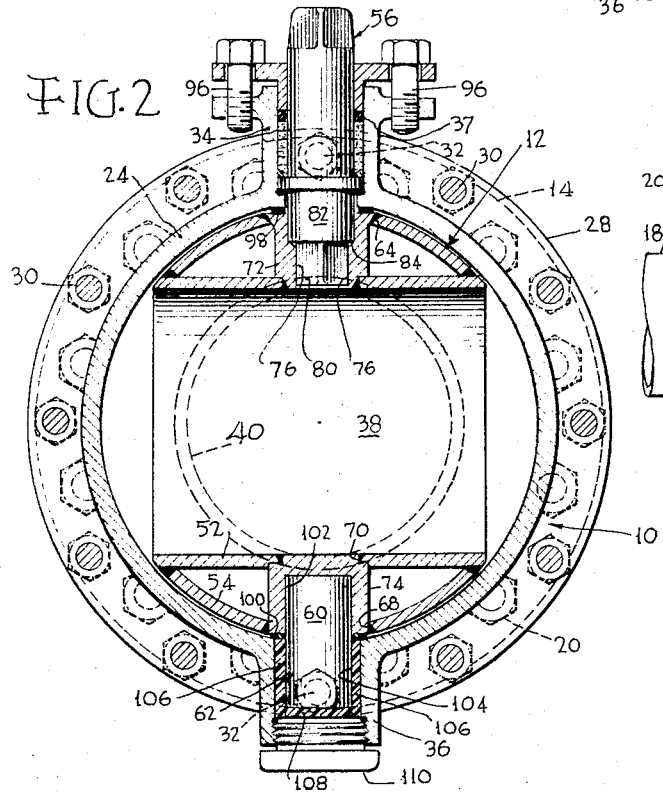
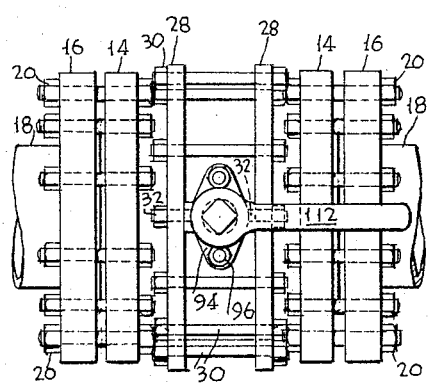
INVENTOR.
Herbert G. Johnson INVENTOR.
Herbert G. Johnson Feb. 6, 1968　　　H. G. JOHNSON　　　3,367,359
BALL VALVE ASSEMBLY WITH CORROSION RESISTANT LINING
Filed Jan. 5, 1966　　　　　　　　　　　　　3 Sheets-Sheet 3

INVENTOR.
Herbert G. Johnson

United States Patent Office 3,367,359
Patented Feb. 6, 1968

3,367,359
BALL VALVE ASSEMBLY WITH CORROSION
RESISTANT LINING
Herbert G. Johnson, 17 N. Drexel Ave.,
Havertown, Pa. 19083
Filed Jan. 5, 1966, Ser. No. 518,876
11 Claims. (Cl. 137—375)

This invention relates to a ball valve assembly with a corrosion resistant lining, especially to such a valve having a corrosion resistant metal jacket lining such as stainless steel, and has for an object the provision of improvements in this art.

In my Patent No. 3,073,336, issued Jan. 15, 1963, there is disclosed a valve which is fully lined interiorly on all fluid contacting surfaces by a jacket of corrosion resistant material, the specific lining material there shown being a fluorocarbon polymer such as polytetrafluoroethylene, known commercially as "Teflon."

Fluorocarbon polymer sheet which is free from porosity and breaks in the formed shape needed for these valves is quite expensive and, while it is required for handling some of the most corrosive fluids, there are many corrosive fluids which can be handled by valves which are lined with corrosion resistant metals such, for example, as stainless steel.

Fluorocarbon polymers, especially "Teflon" or P.T.F.E., are low friction materials, either in mutual contact or in contact with other materials. In the structure of my patent there is mutual contact to form seals between the lining of the valve ball and the lining of the casing.

Stainless steel, however, is not a low friction material and readily galls and binds when in mutual contact.

One of the principal objects of the present invention is to use corrosion resistant materials, such as stainless steel, for completely lining the fluid contacted surfaces of a ball valve.

Another object is to provide improved sealing means for ball valves; specifically to provide low friction materials within the corrosion resistant liners and subject to fluid pressure to hold them into surface contact.

Another object is to provide an improved ball construction with improved supports at the turning axis of the ball.

Another object is to provide an assembly which can be assembled or taken apart very readily and without special tools.

The above and other objects of the invention, as well as various features of novelty and advantages, will be apparent from the following description of certain exemplary embodiments, reference being made to the accompanying drawings, wherein:

FIG. 1 is a vertical axial section of a valve embodying the invention.

FIG. 2 is a transverse section taken on the line 2—2 of FIG. 1.

FIG. 3 is a top plan view on a reduced scale.

Figure 4:
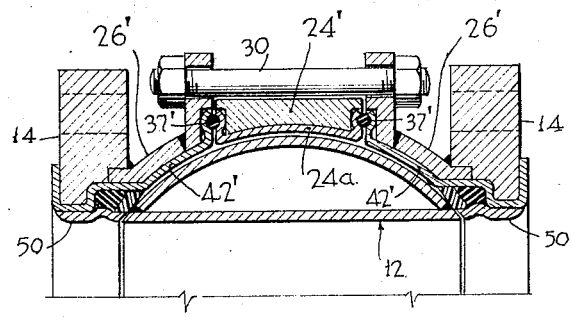
FIG. 4 is a partial central axial section showing a modified form of FIG. 1.

Referring to the first embodiment of FIGS. 1 to 3, the valve comprises a valve casing 10 and a valve ball 12. The casing is provided with end flanges 14 facing the end flanges 16 of adjacent pipe sections 18, bolts 20 securing the flanges 14 and 16 together with suitable corrosion resistant packing 22 between flanges.

The casing comprises a central ring portion or member 24 and opposed cupped end portions or members 26. The end members 26 are provided with inner end flanges 28 through which they may be clamped to the opposed ends of the ring member 24 by bolts 30 and screws 32. The screws 32 enter tapped holes in the ends of the ring member at axially opposed transverse bearing gland elements 34 and 36, the section of the ring member between gland elements being thinner and the bolts 30 extending therepast on the outside. Sealing means, such as corrosion resistant O-rings 37, are clamped between the opposed faces of the adjacent casing members but there is substantially metal-to-metal contact interiorly of the seals so that they are practically isolated from contact by corrosive fluid; at least, they stand clear of the flowing fluid.

Conveniently, the end casing members 26 may be formed of a plurality of elements welded together, as an intermediate cupped member 26a to which the flanges 14 and 28 are welded.

The valve ball 12 is provided with a through passageway or bore 38 and the casing 10, specifically the end members 26, is provided with passageways or bores 40 which are of the same size as the bore 38 of the ball and the interior diameter of the pipe sections and aligned with them when the valve is open.

The end members 26 are lined interiorly by a corrosion resistant material, as by shape-conforming liners, shells, or jackets 42 of stainless steel sheet, each having an outer end flange 42a and an inner end flange 42b integrally formed on the parti-spherical ball-embracing intermediate portion 42c.

These liners, which may be $\frac{1}{16}''$ or less in thickness, may be easily shaped from a single tubular member (which has end flanges preformed on the ends, as by vanstoning) by the method of fluid expansion and end compression disclosed in my Patent No. 3,194,041, issued July 13, 1965, the bulged portion being cut transversely after formation to serve both end members. The liners are preferably formed directly in the end members so as to conform completely to the interior shape; or they may be formed in dies of the proper shape and have the heavy outer casing later assembled from separate parts which are secured about the liner. There may be cases where the liner alone, especially if made somewhat thicker, will have sufficient strength without all of the heavier outer elements, in which case it would be formed in dies and have only enough outer strength members to secure its flanges in the assembly.

Sealing means are provided between the casing and ball around the passages in the end members. This comprises, at each end, a sealing ring 44 of low-friction material, such as fluorocarbon polymer, preferably a filled or coated rigid member with P.T.F.E. The ring is shaped and disposed to engage the ball at its inner edge and stand away from the ball tangentially at its outer portion. It is resiliently urged against the ball by a resilient band 46 of corrosion resistant material and at times by fluid pressure, as will be described.

Both the sealing band and the resilient band are positioned in an annular angular recess 48 in the liner, fitting in a like recess in the casing body, and held in place by an inner ring or tube 50 of corrosion resistant metal, such as stainless steel. The ring 50 is held fixedly in place in any suitable way, as by being roller-swaged to form an annular rib 50a engaging within an edge of the recess. The interior diameter of the rings is the same as that of the ball bore and pipe interior; and since they each extend from the ball to the pipe, the rings comprise the full inside bore shape of the end members.

It is arranged that fluid pressure will be exerted behind the sealing ring and the resilient ring behind it, there being fluid passages 50b through the inner liner, to further urge the sealing ring toward the ball on the pressure side when the valve is closed, the pressure at other times being balanced on both sides of the sealing ring so that it will not be displaced, especially when the open end of the ball bore is passing over part of it, as when the ball is being turned between open and closed positions. The annular band of the ball which is the width of the diameter of the end sealing rings and somewhat beyond may be referred to as the sweep zone of the ball. This must be of accurate spherical shape. The shape of the polar regions beyond the sweep zone need not be accurately surfaced and may have various shaped ends so long as the ball is accurately centered on the longitudinal axis of the passageways or bores.

The ball is formed with an outer shell of a corrosion resistant metal, such as stainless steel, and if needed for strength, with an inner core of rigid shape-retaining material which could be a preformed carbon steel member on which the shell is formed, or may be a metal or plastic poured into the shell after it has been formed. The core is suggested by broken section lines in FIG. 6. The shell is shown as being formed of an inner cylindrical part 52 lining the bore and an outer parti-spherical part 54, the parts being welded together at their meeting edges. If no core is used the shell parts will be thick enough, say 1/8" or more, to avoid deformation by pressure.

Means are provided for turnably supporting the ball to turn about an axis transverse to the fluid passageway or bore, the turnable supporting means comprising opposite aligned journals, such as a turning stem journal 56 of corrosion resistant metal mounted in a bearing and packing gland bore 58 at the top ring gland element 34 and a bottom stem journal 60 of corrosion resistant metal mounted in a packing gland bore 62 at the other ring gland element 36.

In the line of the journals the ball parts 52 and 54 are provided with aligned holes 64 and 66, respectively, on the upper side; and with aligned holes 68 and 70, respectively, on the lower side.

In the upper holes 64, 66 there is inserted a hollow plug 72 which is secured in place in any suitable manner, as by welding around the edges of the holes; and in the lower holes 68, 70 there is inserted a lower plug 74 which is similarly secured in place. The plugs 72 and 74 are of corrosion resistant metal.

The upper plug 72 has a non-round (as square) lower socket aperture portion 76 and an upper round portion 78 to closely fit the non-round end portion 80 and the round portion 82, respectively, of the journal or stem 56, there being a shoulder portion 84 therebetween.

A flange 86 is formed on the stem 56 above a shoulder 88 in a counter bore in the gland 58 and a packing washer 90 of low friction corrosion resistant material is disposed between the flange and shoulder. This packing may be of known type, such as porous metal or fiber glass impregnated or filled or coated with a fluorocarbon polymer such as P.T.F.E. or the like.

Similar packing in tubular form, designated generally as 92, is disposed around the stem in the counterbore and is squeezed tightly by a sleeve 94 secured in place, as by screws 96.

A washer 98 of similar material is secured around the stem between the ball and the casing; and a similar washer 100 is secured between the ball and the casing on the lower side. These washers hold the ball accurately on the flow passage axis.

The lower stem journal 60 is round throughout its length and fits closely in a round hole 102 in the bottom plug 74 and with space therearound in a round bore 104 in the gland bearing bore 62. Tubular packing 106 and end packing 108 of low friction corrosion resistant material of the kind described, are held sealingly in place, as by a cap 110 screwed into the bore 104.

A handle 112 is provided for the stem 56 to turn the valve ball, the stem preferably being aligned parallel with the valve ball bore to readily indicate the ball bore position.

In the first form, just described, the ball and the end members of the casing are completely covered on fluid contacting surfaces by liners or shells of corrosion resistant metal, the end members being backed by thicker and less expensive metal such as carbon steel, and the ball likewise if needed. The ring member 24 also could be formed of carbon steel and have a thin liner of the superior metal; but since the ring is relatively narrow and relatively thin except at the opposite gland elements, it may be formed entirely of the more expensive corrosion resistant metal and it is so shown in FIGS. 1 and 2.

FIG. 4 shows how the ring member 24' may be provided with a liner 24a of corrosion resistant metal, such as stainless steel, the end members 26' and liners 42' being suitably modified to seal the O-rings 37'.

The inner ends of the inner liner members 50 are accurately shaped to fit the outer surface of the ball, which in the sweep zone is formed to cylindrical shape though rounded on the inner edges so that if the sealing rings 44 and journal bearing seals should be destroyed, as by a local fire in the plant or the like, the liner members would seal the valve.

Figure 5:
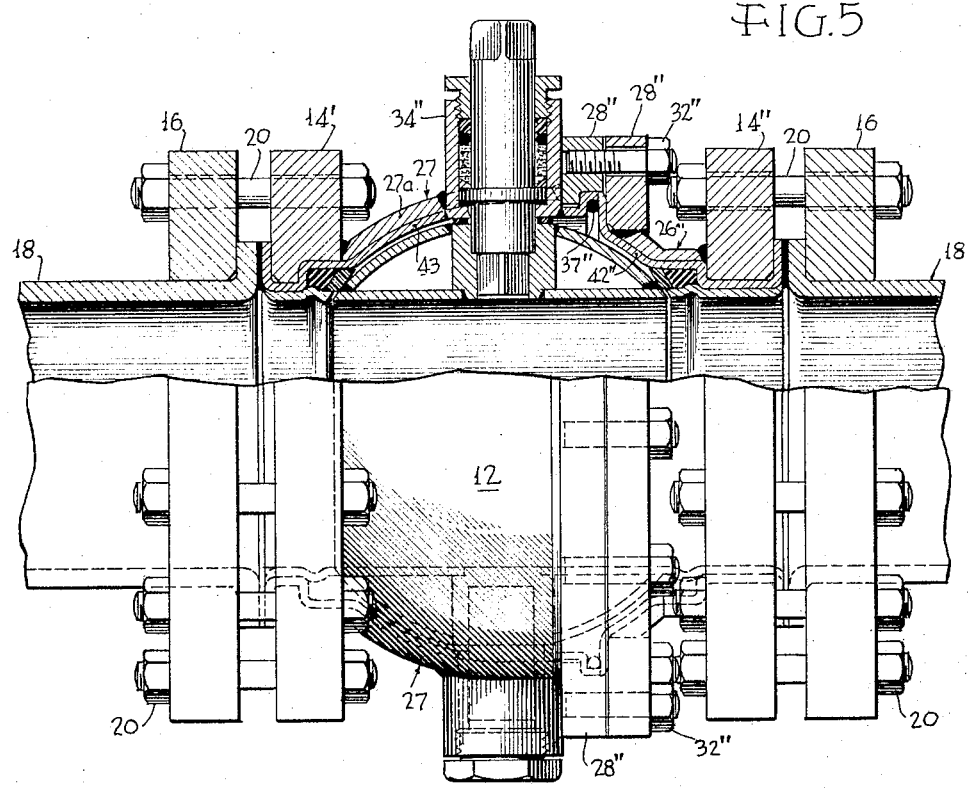
FIG. 5 is a partial view like FIG. 1 but showing a modified construction.

FIG. 5 shows a fully jacketed casing in which one end member 26" and its liner 42" are almost the same as before except that the liner is shaped differently at the inner flange.

The other end member 27 has been combined with the ring member, the intermediate portion 27a being widened and carrying a flange 28" which abuts the flange 28" of the other member, the lining 42" and 43 being suitably modified to compress the sealing O-rings 37" and the flanges being secured together by studs or screws 32".

Figure 6:
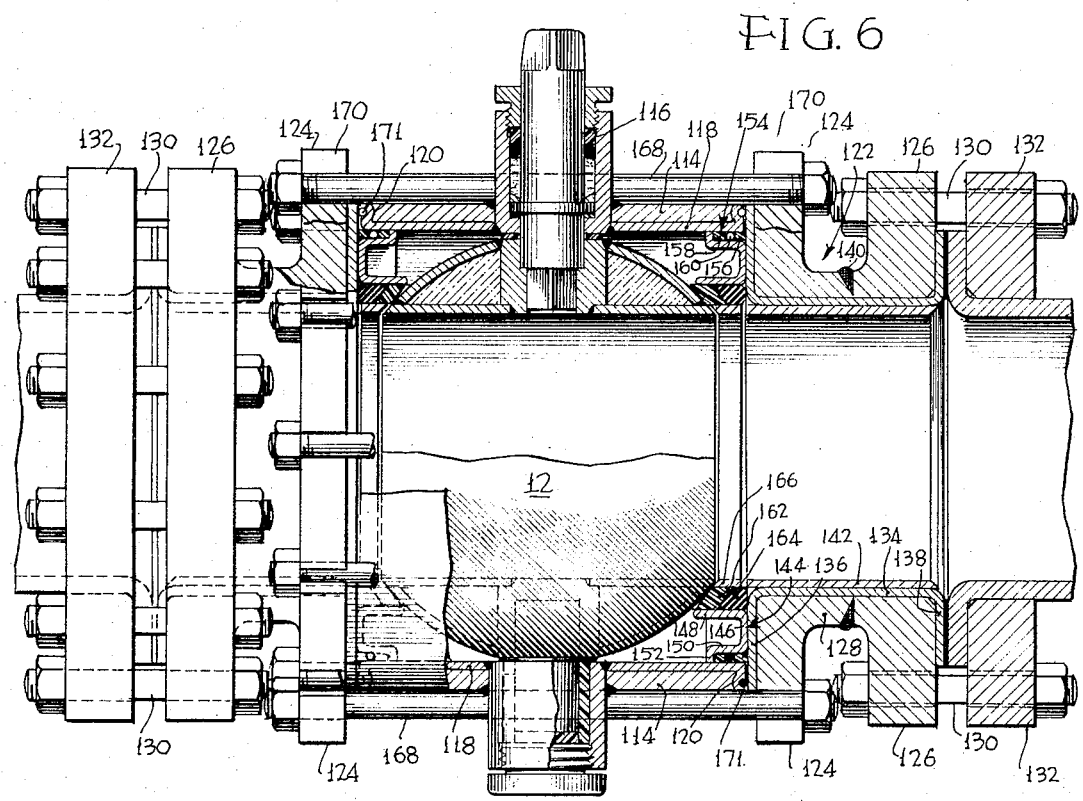
FIG. 6 is a partial view like FIG. 1 but showing another modified construction.

FIG. 6 shows a modified form in which the ball-embracing portion of the casing is made for quick separation from other parts of the assembly and quick replacement in the assembly.

Here the casing body 114 is cylindrical and has the opposed journal bearing gland members welded in, only the handle stem gland 116 being shown. A liner 118 of corrosion resistant material, such as stainless steel is fitted within the heavier outer casing body of less expensive metal and provided with end flanges 120 embracing the ends of the body 114 and the inner portion being welded to the gland member 116, which is of corrosion resistant metal.

End members 122 having an inner flange 124, an outer flange 126, and a cylindrical portion 128 is secured, as by bolts 130, to the end flange 132 of a lined pipe section. A liner 134 of a corrosion resistant metal, such as stainless steel, has end flanges 136 and 138 embracing the flanges 124 and 126, respectively, of the end member. The flange parts 124 and 126 and adjacent cylinder parts may conveniently be made as separate parts and secured together, as by welding 140. An inner liner 142 is firmly secured within the cylindrical portion of the liner 134, as by force-fitting or welding at places.

At each end of the removable ball-carrying casing there is provided an annular channel-shaped removable ring 144 of corrosion resistant metal, as stainless steel, having a radial body portion 146, an inner inwardly extending axial flange portion 148, and an outer inwardly extending flange portion 150. At its inner end the flange portion 150 has an outwardly extending flange 152 extending closely adjacent the casing liner 118 and forming therewith an annular recess for retaining a sealing ring unit 154, this comprising an outer sealing ring proper 156, as of a fluorocarbon polymer such as P.T.F.E., an inner ring 158 of similar material, and a resilient pressurizing O-ring 160 of corrosion resistant material.

Within the inner axial flange portion 148 there is disposed an annular ball sealing ring 162 and a resilient pressure O-ring 164 of the type heretofore described for the other modifications. The rings 162 and 164 are retained by an inner liner ring 166 of corrosion resistant metal, such as stainless steel. The liner ring or tube 166 at its outer end abuts and is backed by the liner 134, previously described, but permits pressure fluid to enter behind the ball sealing means, as before, holes being provided if needed.

The inner removable assembly is sealingly held in place by bolts 168 passing through open-sided slots 170 formed in the flanges 124, the bolts engaging the outer surface of the casing 114 to accurately position the axis of the bore of the ball 12 on the axis of the pipe bore and a sealing gasket 171 being provided between the facing parts which are clamped together.

Although the channel rings 144 are not attached within the removable casing, they are accurately held in position and sealed by fluid pressure during operation. When the assembly is removed they can readily be removed to permit the ball to be removed.

Figure 7:
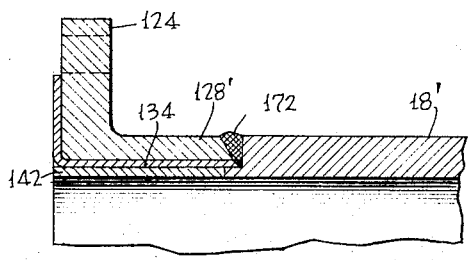
FIG. 7 is a partial view showing a modified portion of the structure shown in FIG. 6.

FIG. 7 shows a slight modification of the FIG. 6 form in which the pipe section flanges and the outer flanges of the members are eliminated and the adjacent pipe end and cylinder portions secured together, as by welding 172.

In operation, the end sealing means around the ends of the passageways of the casing is pressed against the spherical outer end surfaces of the ball around the ends of the passageway or bore of the ball. Both the resilient backing rings and the fluid pressure act to keep the sealing rings pressed against the ball. In normal operation there is no metal-to-metal contact between parts; and the fluorocarbon polymer contact surface of the rings, especially of P.T.F.E., will have a lubricating property since the coefficient of friction of this material is extremely low.

When the valve is open, with the ball bore aligned with the casing bores, the fluid pressure is almost balanced on the sealing ring means and the pressure of the resilient O-ring backing means is sufficient to keep the sealing rings in engagement with the ball. Actually, since the casing is effectively sealed against the escape of fluid to the outside, it would not matter greatly if fluid could flow around the ball except that undesirable eddy current flow would be involved.

When the ball is being turned between open and closed positions in either direction, the side edges of the ball bore pass the sides of the ring but the top and bottom portions of the sealing rings remain in engagement with the ball at all times. Since the rings are rigid they will not get out of position in the turning movement between end positions.

During turning there will be some fluid flow under pressure into the interior of the casing outside the bore sealing rings. This will do no harm since the casing as stated, is fully sealed against the outflow of fluid.

In the case of the form shown in FIG. 6, this presence of fluid under pressure in the sides of the casing is an advantage since it presses the channel rings towards the ends of the casing, presses their flanges apart radially, and presses the outer sealing rings tightly into the corners of the casing, further to aid in preventing leakage from the casing. If desired, means may be provided for draining the fluid from the outer part of the casing when desired.

When the valve is in the fully open position the bore sealing rings are in contact with the spherical portions of the ball around the bore and are pressed against the ball by both resilient mechanical pressure of the backing rings and by fluid pressure behind the sealing means. There may be some fluid pressure on both ends of the ball but, of course, the greater pressure will be on the upstream end. Since the ball is mounted on journals held in fixed axial position by their bearings on both sides of the axis, the seals are held precisely in position relative to the ball to avoid possible leakage which might result if one side of the ball should be free to shift axially as would be the case if one side did not have a journal support.

Furthermore, there is no danger of imposing damaging pressure on the seals as might occur if the ball could shift axially at one side. Axial support, of course, has previously been provided for solid ball valves but the matter is of particular importance for jacketed ball valves, especially where the sealing means is relatively soft and easily damaged as is the fluorocarbon polymer surface of the sealing rings provided herein.

In the FIG. 6 form the pressure fluid in the closed position of the ball not only forces the resilient backing ring toward the sealing ring but forces it outward by distortion to seal the channel ring to the surface of the end casing and also forces the entire channel ring outward insofar as it will stretch under outward radial forces, to urge the outer seals against the outer casing. Insofar as there is any entrapped fluid under pressure in the outer part of the casing, that also will tend to force the channel rings against the inside surfaces of the casing.

Further in connection with the FIG. 6 form, it will be seen that by loosening the nuts on the clamp bolts they may be removed from their slots; and the entire middle casing part with the ball and its bore seals can be removed from between the end parts which are secured to the pipe ends. The channel rings can then be removed and the ball removed if desired.

It may be helpful to explain here that standard practices and regulations fix the distance between pipe ends for certain pipe and valve sizes, and the end adapters provided hereby are intended to accommodate for such standardized dimensions.

The FIG. 6 form is particularly desirable in that it provides for removal of the ball carrier part by removing one set of bolts, and that by loosening and slipping out of slots radially, instead of removing three or four sets of bolts.

Further, since in all cases the parts are clamped together axially instead of being screwed together, there is greater ease of assembly and disassembly and greater certainty of obtaining accuracy of assembly location.

One of the outstanding advantages of the present invention is the great economy which is effected by lining the entire fluid contacted passages by formed sheet lining of expensive corrosion resistant material and backing the lining sheet with much less expensive material. If an expensive metal like stainless steel should be used for the entire structure it would require several times the weight of this costly material in the finished form as is required hereby; but, more importantly, would require more costly forming procedure and the loss of much more metal as scrap in the forming operations. A sheet lined valve as disclosed herein will cost only half or less than a valve made entirely of an expensive corrosion resistant metal like stainless steel.

It is thus seen that the invention provides an improved ball valve assembly, especially for fully lined metal-jacketed valves, and more particularly a valve assembly jacketed with corrosion resistant sheet metal such as stainless steel, Monel metal, or such other corrosion resistant metal sheet liners as may be suitable for the corrosive fluid being handled.

While certain embodiments of the invention have been described in order to illustrate the principles of the invention, it is to be understood that there may be various embodiments and modifications within the general scope of the invention.

I claim:

1. A fully lined ball valve assembly for handling corrosive fluids under pressure, comprising in combination, a ball casing having fluid passages and a complete inner lining of corrosion resistant material, a valve ball having a complete lining on its outer surface and fluid passage of corrosion resistant material, means in said casing and within its lining forming an annular recess around the fluid passages at the ends of the fluid passage of the ball, annular corrosion resistant sealing ring means in said recess, and an inner liner of corrosion resistant material disposed within said sealing ring means and admitting pressure fluid behind said sealing rings to press them against the surface of the ball valve in its swept zone.

2. A fully lined ball valve assembly as set forth in claim 1, in which said sealing ring means comprises, at each end, an inner ring having a contact surface of a fluorocarbon polymer material engaging the ball, and an outer expansive ring which constantly urges said inner ring against said ball.

3. A fully lined ball valve assembly as set forth in claim 2, in which said inner sealing ring is rigid and has a contact surface of P.T.F.E.

4. A fully lined ball valve assembly as set forth in claim 2, in which said inner ring has an inner surface disposed at a tangent to the surface of the ball and in engagement with the ball at its inner edge.

5. A fully lined ball valve assembly as set forth in claim 1, in which the linings of said casing and ball are formed of sheet elements of corrosion resistant metal.

6. A fully lined ball valve assembly as set forth in claim 1, in which the lining surfaces of said casing and said ball are formed of stainless steel.

7. A fully lined ball valve assembly as set forth in claim 1, in which said ball is formed of an outer spherical part of pressure-resistant sheet of corrosion resistant metal and an inner tubular part of pressure resistant and corrosion resistant sheet metal sealingly joined at its edges to the edges of the spherical part, and aligned hollow journal supporting plugs sealingly secured in transverse alignment between said cylindrical and tubular parts on each side of the tube axis, the casing having aligned sealed bearings carrying journals secured in the plugs of said ball.

8. A fully lined ball valve assembly as set forth in claim 1, in which said casing comprises end parts adapted to be secured to adjacent pipe members and an intermediate part carrying the ball and the ball sealing means removably secured between said end parts, said intermediate part including an outer lined cylindrical portion carrying ball journal bearing glands and having an axial length equal to that of the ball plus the sealing means at the ends of the ball, the cylindrical casing portion having a diameter greater than that of the ball, annular removable rings of corrosion resistant metal in each end of said casing portion having inner seal-retaining elements, and an inner tube of corrosion resistant metal at each end forming the inner retaining means for said sealing rings.

9. A fully lined ball valve assembly as set forth in claim 8, in which said end parts of the casing are provided with tubular liners which retain said inner tubes axially when the intermediate part is assembled with the end parts.

10. A fully lined ball valve assembly for handling corrosive fluids under pressure, comprising in combination, a ball casing having end fluid passages and a complete inner lining of corrosion resistant material, said casing including an intermediate part having aligned sealing journal bearings on each side of the fluid passage axis and end parts sealingly secured to the intermediate part by end clamping means; a valve ball comprised of a tubular sheet and a spaced spherical sheet of corrosion resistant material secured together at their edges, the tubular sheet forming a passage adapted to be aligned with the casing passages, said ball sheets on each side of the axis having aligned openings, hollow plugs sealingly secured in said ball sheet openings; journals secured in said plugs and extending into said journal bearings of the casing, one of said journals extending out of its bearing and adapted to be turned to turn the ball; and sealing means carried by said casing around the end passages and in engagement with the circumference of said ball in its passageway zone.

11. A fully lined ball valve assembly as set forth in claim 10, wherein said intermediate casing part comprises a cylindrical member of a diameter greater than that of the ball and having removable rings therein carrying said sealing means.

References Cited

UNITED STATES PATENTS

| 3,073,336 | 1/1963 | Johnson | 137—375 |
| 3,166,291 | 1/1965 | Grove | 251—174 XR |
| 3,173,647 | 3/1965 | Bryant | 251—315 XR |
| 3,217,739 | 11/1965 | La Valley et al. | 137—375 |

HENRY T. KLINKSIEK, *Primary Examiner.*